United States Patent [19]

Protti

[11] Patent Number: 5,536,509
[45] Date of Patent: Jul. 16, 1996

[54] METABOLIC CORRECTOR

[75] Inventor: Carlos R. Protti, Buenos Aires, Argentina

[73] Assignee: Rauli Corporation, Miami, Fla.

[21] Appl. No.: 261,134

[22] Filed: Jun. 14, 1994

[51] Int. Cl.⁶ .................................................. A23K 1/18
[52] U.S. Cl. .................................................. 426/2
[58] Field of Search .................................................. 426/2

[56]  References Cited

U.S. PATENT DOCUMENTS

| | | | |
|---|---|---|---|
| 3,876,810 | 4/1975 | Carbonniere | 426/24 |
| 4,087,556 | 5/1978 | Harte | 426/2 |
| 5,000,964 | 3/1991 | McCauley | 426/2 |
| 5,021,247 | 6/1991 | Moore | 426/69 |
| 5,085,874 | 2/1992 | Jungvid | 426/41 |
| 5,183,674 | 2/1993 | Olin | 426/2 |
| 5,198,252 | 3/1993 | Simsa et al. | 426/53 |
| 5,211,980 | 5/1993 | Cox | 426/601 |
| 5,219,596 | 6/1993 | Smith et al. | 426/2 |

OTHER PUBLICATIONS

Gonzalez et al Cuban J. Agric. Sci 25(1), 1991, 77–81 Abstract only.

Huskic Praxis Veterinaria vol. 38(2): pp. 123–130 1990, Abstract only.

Nadazdin et al Veternarski glasnik, 1988 vol. 42(9) pp. 591–598 Abstract only.

Boyd, Harold C., et al., "Introduction to the Algae Structure and Reproduction", Second Edition, 1985, 1978, pp. 365–374.

Chapman, V. J., "The Algae", 1968, pp. 186–189.

*Primary Examiner*—Donald E. Czaja
*Assistant Examiner*—Choon P. Koh
*Attorney, Agent, or Firm*—Michael A. Gollin

[57] ABSTRACT

A nutritional supplement is prepared from Macrocystis algae meal, microcapsules of yeast, and powdered calcite from sea shells. The supplement improves the health and growth of dairy and beef cattle, horses, and chickens, and improves milk and egg production. Minerals and vitamins may be added to the supplement where desired to counteract metabolic deficiencies in the animal.

18 Claims, 2 Drawing Sheets

METABOLIC CORRECTOR

BACKGROUND OF THE INVENTION

1. Field of the Invention

This invention relates to nutritional supplements for livestock. More specifically, the invention relates to a combination of Macrocystis algae, yeast, calcite, and other minerals, and methods of supplementing animal feed to promote growth and productivity.

2. Related Art

Throughout history, people tending livestock have sought to provide a nutritious feed that provides good growth, health, and productivity of the animal. With ruminants such as cows, certain nutritional supplements are added to a feed blend to promote milk production, calving, and so on. Those raising horses try to optimize size and health by selecting a wholesome blend of food such as hay and oats and supplements. Poultry farmers use a feed blend that is intended to maximize the number, quality, and size of eggs, or to maximize growth.

U.S. Pat. No. 5,085,874 relates to a feed product comprising whey, dry yeast, and fat together with proteins, starch, and other components. U.S. Pat. No. 5,000,964 describes feedstuffs with low levels of yeast together with a carrier and other components. U.S. Pat. No. 5,211,980 discloses a lipid pellet having an algin component such as sodium alginate and other nutritive elements.

The prior art does not include a combination of natural components including Macrocystis algae, yeast, and calcite that is adjusted to the needs of a particular type of livestock, and provides excellent growth and performance.

SUMMARY OF THE INVENTION

A nutritional supplement according to the invention is prepared from algae, yeast, and a mineral component. The supplement acts as a metabolic corrector and improves the health and growth of dairy and beef cattle, horses, and chickens, and improves milk and egg production. Minerals and vitamins may be added to the supplement where desired to counteract metabolic deficiencies in the animal.

According to the invention, a nutritional supplement for animals contains Macrocystis algae meal, dry yeast, and a mineral component. Preferably, the algae is dried and crushed to a meal, the yeast is Cepa Sc in microcapsules, and the mineral component is powdered calcite from sea shells. In preferred formulations the Macrocystis algae comprises about 25–75% by weight, the yeast comprises about 10–50% by weight, and the powdered calcite comprises about 10–30% by weight. In an especially preferred formulation, the Macrocystis algae comprises about 50% by weight, the yeast comprises about 30% by weight, and the powdered calcite comprises about 20% by weight.

The invention also comprises a method of improving the health of an animal comprising combining crushed calcite with Macrocystis algae meal and microcapsulated yeast to provide a nutritional supplement, and feeding the supplement to the animal. The method may also comprise (a) measuring metabolite levels in a stable tissue of the animal; (b) identifying metabolites whose levels are lower than desired; (c) adding the identified metabolites to crushed calcite; (d) combining the calcite with Macrocystis algae meal and microcrystalline yeast to provide a nutritional supplement; and (e) feeding the supplement to the animal.

The method preferably involves providing the supplement in an amount of about 0.1 g to 1.0 g per kg body weight.

The metabolic corrector has other beneficial applications. It can prevent and treat viral infections in animals, particularly poultry, when a therapeutically effective dose of a combination of the metabolic corrector is administered orally. It can also promote physical and mental health in humans.

BRIEF DESCRIPTION OF THE DRAWINGS

The accompanying drawing figures are provided to facilitate understanding the invention.

DETAILED DESCRIPTION OF THE PREFERRED EMBODIMENTS

Figure 1:
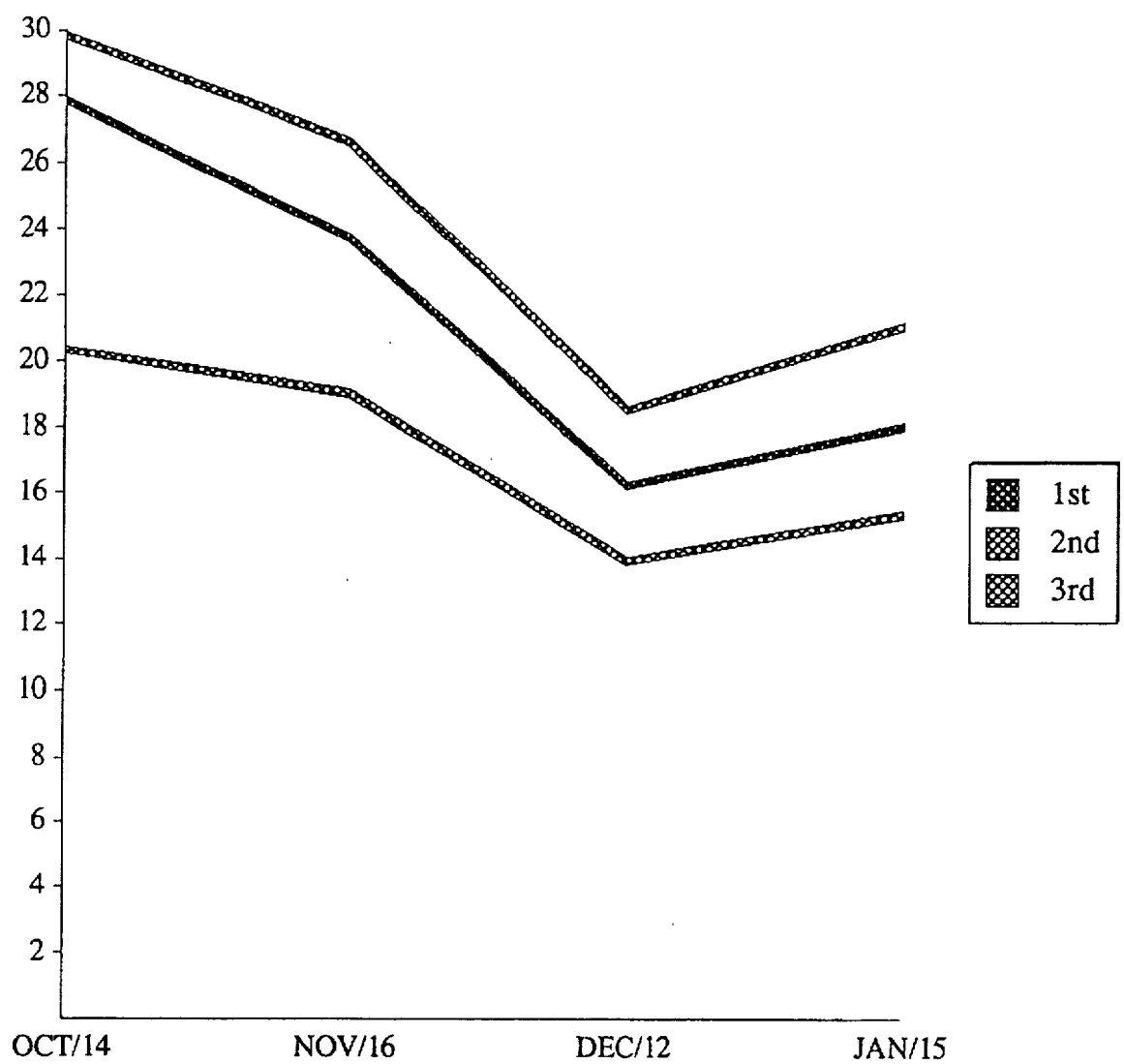
FIG. 1 illustrates milk production records for dairy cattle fed with the metabolic corrector as compared to controls.

In describing preferred embodiments of the present invention, specific terminology is employed for the sake of clarity. However, the invention is not intended to be limited to the specific terminology so selected, and it is to be understood that each specific element includes all technical equivalents which operate in a similar manner to accomplish a similar purpose.

In its preferred form, the metabolic corrector is prepared from three basic ingredients. Other minerals and supplements may be added according to the specific needs of particular animals. The metabolic corrector is preferably made up as follows:

1) edible marine algae genus Macrocystis, crushed into a meal form—about 25–75% by weight, preferably about 50%;

2) yeast culture, preferably a live yeast such as Cepa Sc 47 in microcapsules—about 10–50% by weight, preferably about 30%; and 3) calcite, preferably from pulverized sea shells, as an excipient—about 10–30% by weight, preferably about 20%.

A preferred dosage is about 0.1 to about 1 gram per kg live weight of the animal in question, most preferably about 0.25 grams per kg. Other amounts, lower or higher, may be desirable depending on the animals' particular needs.

In dry form, the metabolic corrector typically comprises about 85% dry matter and about 15% water. These proportions may vary depending on climate and storage conditions. It is typically fed dry, but may be added to warm water for consumption, in which case it forms a viscous, gelatinous preparation.

Mineral elements may be added to the calcite excipient as indicated in each case depending on the nutritional requirements of the animal. The calcite component generally contains substantial amounts of calcium, sodium, phosphorous, potassium, magnesium, and sulfur. Other minerals in the excipient may include cobalt, silver, boron, bromine, chromium, copper, iron, iodine, mangasese, molybdenum, nickel, strontium, vanadium, and zinc. Typically, slow growing animal tissue such as poultry feathers, hair, hoof, or blood are sampled and analyzed by an assay for mineral content. The quantities of these elements are determined in each particular case by an analysis of blood, hair or feather samples. The qualitative and quantitative mineral content of the sampled tissues are compared to a standard source, such as the U.S. Department of Agriculture Minimum Daily Requirement Tables for the particular species, referred to as Cantidad Suficiente Para 100, or quantity sufficient to reach 100% of the desired level, by weight or volume. If the level of a particular mineral in a test animal is below the recommended level, then an extra quantity of that mineral is added to the calcite excipient as a supplement to meet the animal's minimum requirements. The supplemental minerals are easily obtainable anywhere in the world without restriction.

Using the metabolic corrector in proportions adequate to each animal species in general optimizes the utilization of the available nutrients and coenzymes in the feed ration vital to normal metabolism. The metabolic corrector apparently acts as a nutritional "buffer," and allows for the adequate absorption of the metabolites in the feed ration, i.e., glucids, proteins (amino acids), vitamins, and macro and microelements.

The metabolic corrector of the invention has been found to have many beneficial effects with various animals. These benefits are described here in terms of numerical observations made during the course of recent experimental procedures.

Each animal species has different nutritional requirements that are carefully monitored in the process of formulating the metabolic corrector. Minerals are added as necessary to the calcite excipient, to supplement the mineral content of animals whose levels fall below the currently updated USDA Minimum Daily Requirement Tables.

Dairy Cattle

Ruminants more often than not present digestive disturbances as a result of man's constant interference in their feed formulation. This exposes the milking cow to nutritional factors and conditions which tend to limit optimum milk production and often is the cause for toxic and semi-toxic levels of certain elements. When incorporated into the feed ration, the interaction of the metabolic corrector in the ruminal medium modifies the metabolism of the intestinal flora. This interaction increases the pH of the digestive medium to 6.9, a level which is considered to be normal.

Cows under pasture feeding conditions tend to have a ruminal pH in the order of 5.9/6.2. This acid ruminal medium causes an alteration of the ruminal flora and therefore an alteration of the metabolic process with special emphasis on proteins. Approximately 80% of the protein in the ration is broken down in the rumen, and through the cellulitic (or cellular) action of the flora, is converted into bacterial protein. The undigested protein is transformed into ammonia (hepatotoxic ammonia).

The high level of ammonia overtaxes the liver as ammonia is absorbed through the walls of the rumen in transit to the circulatory system. These conditions result in a loss of protein in the diet and predominant toxic state in the animal. The optimum ammonia concentration content for an acceptable protein metabolism is in the order of 5 grams per every 100 milliliters of ruminal fluid. Cows in the above examples have been found to have levels of 30 to 40 grams per 100 milliliters of ruminal fluid.

When the metabolic corrector is added to the daily ration, in an amount of about 100 grams per day for a cow of 1,100 lbs. live weight, after a period of time, the pH becomes adjusted to a desirable level. Thereafter, bacteria and protozoans will function adequately in the breakdown of proteins thereby reducing the levels of ammonia and thus increasing bacterial protein.

From the actions detailed above we can make the following observations:

There is an increase in milk production of between 10 to 12%.

Milk fat content increases between 18 to 20%.

Protein content increases from 3 to 5%.

There is a high concentration of vitamins and minerals in the milk.

As a result of less toxemia there is a higher degree of assimilation of nutrients of high biological value, better intestinal passage which results in a more vigorous feeding. Herds have been observed to have a higher proportion of cows in heat as well as an increased response to successful artificial insemination.

Beef Cattle

Certain observations have been made in beef cattle as a result of using this metabolic corrector, the most important being as follows:

More rapid weight gain and overall growth is observed in young weaning animals, when fed the metabolic corrector together with their milk.

Cattle in pens have been observed to increase their weight between 30 to 40% more than the untreated norm.

Use of the metabolic corrector provides a higher carcass weight of the animals at slaughter.

Horses

Sporting horses often live in an artificial environment (a box), with little or no light and are fed a ration which is brought by man. Generally horses under this medium live under a permanent state of stress. This medium often results in lack of appetite (anorexia); disturbances in the color and odor of the fecal matter; and exposure to colic. It is commonly observed, when exposed to a competitive environment, that these animals show a general lack of appetite and stress.

The use of the metabolic corrector in the ration results in a stabilization of the digestive process as shown in the normalization of the fecal matter, an increase in appetite shown under voluntary feeding and better performance under a training environment.

In addition, it has been observed that horses have improved their red blood cell formation (erythropoiesis), red blood cell count as well as an increase in the relative red blood cells in the plasma (hematocritical), which can be traced to the action of the metabolic corrector on the overall process of blood formation (hematopoiesis).

High Performance Laying Hens

This is the sector where the metabolic corrector has been proven and tested the most, showing the following results:

An increase of 5 to 6% in quantity of eggs laid

A distinct difference in the distribution of egg size:
15 to 35% more large size eggs
20% less medium size eggs
15 to 18% less small size eggs 2 to 4.5% increase in the weight of the egg Mortality due to viruses affecting the laying hen population was reduced by 50% on those hens being fed the corrector. It is felt that the utilization of the metabolic corrector stimulates immune mechanisms, thus increasing the animal's natural defenses.

Uniformity of weights (according to figures recommended by the developers of the genetic string of laying hens) is obtained more readily. The uniformity of weight on those treated hens was observed to be 20% higher than for the untreated hens.

The analytical content of Component A has been determined. It is made up of 15% water and 85% dry matter. The following details are based on the dry matter only:

| A) Metabolites: (approximately) | |
|---|---|
| - Proteins | 34.80% |
| - Fats | 4.35% |
| - Mineral Ashes | 17.40% |
| - Carbohydrates | 39.10% |
| - Fiber Content | 4.35% |
| B) Vitamins: (in Milligrams per Kg. Dry Matter) | |
| - Vitamin A (Beta Carotene) | 40 |
| - Vitamin D (Calciferol) | 5 |
| - Vitamin E (Tocopherol) | 70 |
| - Vitamin B1 (Thiamine) | 15 |
| - Vitamin B12 (Riboflavin) | 6 |
| - Vitamin C (Ascorbic Acid) | 200 |
| - Panthotenic Acid | 12 |
| - Niacin | 50 |
| - Folic Acid | 0.5 |
| - Biotin | 0.5 |
| C) Amino Acids: (in Milligrams/100 gr. Protein) | |
| - Alanine | 6 |
| - Arginine | 5.5 |
| - Aspartic Acid | 8.5 |
| - Cisteine | 0.5 |
| - Glutamic Acid | 12 |
| - Glicine | 3 |
| - Histidine | 8.8 |
| - Triptophane | 0.9 |
| - Tyrosine | 1.8 |
| - Isoleucine | 2.5 |
| - Leucine | 3.5 |
| - Lysine | 5.0 |
| - Methionine | 1.0 |
| - Pheniialanine | 2.5 |
| - Preline | 2.7 |
| - Serene | 3.5 |
| - Treonine | 2.8 |
| - Valline | 3.0 |
| - Cisteine | 0.5 |
| - Citruline | 2.0 |
| - Omitine | 1.5 |
| - Tyrosine | 0.4 |
| - Treonine | 0.3 |
| D) Mineral Content: (in Milligrams/Kg. Dry Matter) | |
| - Calcium | 7,000 |
| - Sodium | 11,000 |
| - Phosphorus | 6,000 |
| - Cobalt | 3.5 |
| - Silver | 0.5 |
| - Boron | 70 |
| - Bromium | 1 |
| - Chromium | 1 |
| - Copper | 4 |
| - Iron | 35 |
| - Iodine | 450 |
| - Potassium | 12,000 |
| - Magnesium | 1,800 |
| - Manganese | 26 |
| - Molybdenum | 0.1 |
| - Nickel | 10 |
| - Sulfur | 2,800 |
| - Strontium | 1 |
| - Vanadium | 1 |
| - Zinc | 35 |

The amounts of these components may vary. However, it is important that the algae, yeast, and calcite components of the metabolic corrector be used in their essentially intact form. For example, a synthetic combination of the analytically determined components of Component A does not achieve the results claimed heretofore. Likewise, the use of less than all three of the ingredients of the metabolic corrector may be beneficial but does not provide the optimal results according to the invention. Preferably, the algae, yeast, and calcite must all be present together to provide the surprising effectiveness of the metabolic corrector.

The genus Macrocystis is the largest algae in the family Lessoniaceae. It includes *M. pyrifera L.*, *M. integrifolia* Bory, and *M. angustifolia* Bory. *M. pyrifera* is preferred, although it is expected that other species may be employed pursuant to the invention. Algaes of related genuses include Dictyoneurum, Pelagophycus, and Nereocystis. The blades of the algae are the preferred components, although the entire plant may be used.

EXAMPLE 1

An experiment was conducted with cattle to determine whether the metabolic corrector provided a marked improvement in the general metabolism (specifically in the ruminal metabolism) of cattle through the use of human medical techniques, thereby improving the production of beef and milk. The specific objective of the experiment was to determine the correction of the digestive media through the use of diagnosed metabolic correctors in a milking herd in Argentina. The breed of cattle was Holstein Fresian cows.

METHODOLOGY

Criteria in Selecting the Test Group

The process of selection of the Test Group was based on the diagnosis of existing needs in the herd at a time where maximum milk production was required.

This period, between 0 to 90 days after calving, demands from the cow the use of all of its reserves to meet the highest nutritional requirements imperative at the time of maximum lactation.

By the same token, it is during this period that the cow must call on all its resources in order to replace tissue lost during parturition, thus preparing itself for the coming period of heat and pregnancy essential for the animal to be considered an economically productive unit.

As a first step, these were the criteria used in selecting the Test Group from the herd. No first pregnancy heifers were selected and were left for a later study of this same type. Thence two lots of ten (10) animals each were picked at random, each animal with an individual I.D. number. These two (2) groups are herein known as "Test Group" and "Control Group," respectively.

Initial Diagnosis

The diagnostic process began with the extraction of serum and blood samples from each individual animal. These samples provided a mineral content profile for each individual Group at the onset of the experience.

The minerals tested were those considered most lacking in the region. These minerals are: Calcium (Ca); Phosphorus (P); Magnesium (Mg); and Copper (Cu) as well as Total Protein and Albumin.

These profiles were analyzed taking into account the lab results and a diagnosis of the amounts lacking was effected.

Treatment

A metabolic corrector was prescribed for the test herd in view of this diagnosis and taking into consideration the lactating period previously mentioned. The same formulation was used for all the cows in the test group. This metabolic corrector was fed twice a day at a rate of 100 grams/animal/day. The amount of metabolic corrector fed (100 grams/animal/day) remained the same any time that the feed quantity was either changed or modified thus establishing a new relationship between the feed ration and the corrector.

Feed Management

This experiment began on Dec. 11th, 1992 with the analysis of each cow's milking record since Oct. 15th, 1992, in order to determine the adjustments necessary as to productions liters/day/cow as well as milk fat content. This was performed on each of the two Groups to avoid any misinterpretation of the final results.

Both Groups were handled jointly with the rest of the heard at milking time but were separated from the milking herd when they were put out to pasture. This insured that both test Groups were first to be on new pasture. This mode was used until Dec. 30th, 1992 when due to extreme drought conditions prevalent in the region since end November, required that the test Groups be handled together with the rest of the herd.

Pasture time on a daily rotating basis was set from 0800–1500 hrs—then milking; and from 1800–0400 hrs.—then milking. As of Dec. 30th, 1992 the Groups were put into pens at night where good quality hay was provided after pasturing on grass.

Good quantity and volume of forage was provided both Groups during pasture; as the drought began to set in, this was changed to low volume-good quality forage during daytime and high volume-lower quality forage during the evening time when cows were in their pens.

During the milking, the cows were fed normal well balanced commercial feed (16% protein). The ration provided each animal depended on their milk production; both the "Test Group" as well as the "Control Group" were fed 5 Kg/cow/day (11 lbs./cow/day). This daily ration was divided in two, half being fed at each milking. The "Test Group" was fed the additional 100 grams per day of the prescribed metabolic corrector.

Normal sanitary conditions were kept during the whole experience; no cases of clinical mastitis were recorded in either Group.

The grazing sequence is shown in Table 1. The feed plants found in the Argentinean pastures are as follows:

Trebol Rojo—Red Clover (trifolium pratensis)
Pasto Ovillo—Sheep Grass (dactylis glomerata)
Sorgo Forrajero—Sorgum (sorgum sacaratum)
Agropiro (agrophrum alongatum)
Melilotus—Lotus (mililotus officinalis)
Moha de Hungria (satarea italium pratensis)
Phalaris (phalaria bulbosa)

TABLE 1

Grazing (pasture) Sequence during the Experience.

| Daytime Grazing | | Nighttime Grazing | |
|---|---|---|---|
| Date | Type | Date | Type |
| Nov. 02 to | #91 R. Clovr + | Nov. 2 to | #90 Agropiro |

TABLE 1-continued

Grazing (pasture) Sequence during the Experience.

| Daytime Grazing | | Nighttime Grazing | |
|---|---|---|---|
| Date | Type | Date | Type |
| Nov. 10, 1992 | Sheep Past | Nov. 8, 1992 | & Lotus |
| Nov. 11 to | #90 R. Clovr + | Nov. 9 to | #90 R. |
| Nov. 19, 1992 | Sheep Past | Nov. 16, 1992 | Clover* Falaris. |
| Nov. 20 to | #91 R. Clovr + | Nov. 17 to | #89 Agropiro |
| Nov. 27, 1992 | Sheep Past | Nov. 29, 1992 | & Lotus |
| Nov. 28 to | #90 R. Clovr + | Nov. 30 to | Bale of Moho |
| Dec. 2, 1992 | Sheep Past | Dec. 13, 1992 | 8.816 lbs./day/cow |
| Dec. 3 to | #89 R. Clovr + | Dec. 14 to | Bale of R. |
| Dec. 18 1992 | Sheep Past | Jan. 6, 1993 | Clover 8.816 lbs./day/cow |
| Dec. 19 to | #91 R. Clovr + | | |
| Dec. 26, 1992 | Sheep Past | | |
| Dec. 27 to | Sorghum | | |
| Jan. 6, 1993 | Feed | | |

Data Acquisition

The following Data Acquisition scheme was designed taking into account the specific objectives set forth at the onset:

A) Individual milk production per cow in both Test as well as Control Groups.

1) Initial Sampling

2) Monthly Sampling

B) Milk Fat content (Grasa Albumina) in both Test as well as Control Groups.

1) Initial Sampling

2) Monthly Sampling

The Initial Milk Production Sample (under A-1) was obtained from the Control Sheets kept by CASTELMAR, the local dairy farmer's coop.

Subsequent Monthly Samples (under A-2) were taken in the same manner for the months of November, December (1992) and January 1993.

Table "2" provides a comparison of Milk Production in the "Test Group," the "Control Group" as well as the whole of the milking herd. A graph is provided as FIG. 1.

TABLE 2

Milk Production Records - Test Group & Control Group - compared

| Cow I.D. No. | Calving Date | No. of Calves | Lactat. Days | MILK PRODUCTION CONTROL | | | |
|---|---|---|---|---|---|---|---|
| | | | | Oct. 14 | Nov. 16 | Dec. 12 | Jan. 15 |
| *"CONTROL GROUP"* | | | | | | | |
| 508 | 9/01/92 | 7 | 43 | 33.4 | 24.0 | 20.6 | 20.0 |
| 755 | 8/23/92 | 3 | 52 | 34.6 | 29.6 | 16.6 | 20.0 |
| 862 | 8/09/92 | 2 | 66 | 25.4 | 25.2 | 14.8 | 19.4 |
| 878 | 7/26/92 | 2 | 80 | 23.8 | 26.0 | 13.8 | 13.8 |
| 893 | 9/01/92 | 2 | 43 | 27.4 | 25.8 | 14.6 | 18.6 |
| 896 | 9/25/92 | 2 | 19 | 24.7 | 26.4 | 20.2 | 19.8 |
| 979 | 9/23/92 | 3 | 21 | 28.4 | 19.8 | 16.2 | 18.2 |
| 1129 | 9/05/92 | 5 | 39 | 22.0 | 19.6 | 16.4 | 14.4 |
| 1131 | 8/01/92 | 3 | 74 | 28.4 | 21.2 | 14.2 | 16.4 |
| 1145 | 7/30/92 | 3 | 76 | 30.2 | 20.0 | 14.8 | 20.0 |
| Ave. Milk Production | | | 52 | 27.8 | 23.7 | 16.2 | 18.0 |
| *"TEST GROUP"* | | | | | | | |
| 541 | 9/02/92 | 7 | 35 | 33.8 | 30.0 | 21.0 | 23.2 |
| 694 | 8/16/92 | 3 | 59 | 33.8 | 28.4 | 19.0 | 26.0 |
| 738 | 9/15/92 | 3 | 28 | 33.0 | 27.4 | 17.2 | 21.2 |
| 764 | 8/15/92 | 3 | 60 | 27.6 | 23.4 | 17.2 | 18.4 |
| 818 | 9/05/92 | 2 | 39 | 34.6 | 30.0 | 20.4 | 22.2 |
| 964 | 8/16/92 | 2 | 59 | 27.3 | 24.6 | 17.0 | 21.6 |
| 989 | 9/25/92 | 2 | 19 | 26.8 | 27.0 | 20.8 | 20.4 |
| 1000 | 9/22/92 | 5 | 22 | 26.6 | 22.4 | 17.4 | 19.8 |
| 1093 | 7/20/92 | 5 | 86 | 31.6 | 27.4 | 16.4 | 17.8 |
| 1141 | 7/21/92 | 3 | 85 | 26.6 | 24.2 | 17.2 | 18.4 |
| Ave. Milk Production | | | 52 | 29.8 | 26.6 | 18.5 | 21.0 |
| DIFFERENCES FOUND IN %: | | | | +7.2% | +12.2% | +13.6% | +16.6% |

At the onset of the Experiment the Lactation Period for the "Control Group" was 52 days and 50 days for the "Test Group". These periods have been adjusted for variances using tables provided by the S.R.A.—Sociedad Rural Argentina—which take into consideration adjustment of lactation periods of 305 days as related to age. Table "3" contains the relevant information from these tables.

TABLE 3

Lactation Periods to 305 days - Conversion Table used

| No. OF LACT. DAYS | AGE AT PARTUM (in yrs. & decimals) | | No. OF LACT. DAYS | AGE AT PARTUM (in yrs. & decimals) | |
|---|---|---|---|---|---|
| | <3 years | >3 years | | <3 years | >3 years |
| 15 | 16.67 | 14.63 | 165 | 1.62 | 1.51 |
| 35 | 9.99 | 8.9 | 175 | 1.54 | 1.44 |
| 35 | 7.13 | 6.36 | 185 | 1.47 | 1.38 |
| 45 | 5.54 | 4.96 | 195 | 1.41 | 1.33 |
| 55 | 4.53 | 4.07 | 205 | 1.35 | 1.28 |
| 65 | 3.85 | 3.48 | 215 | 1.3 | 1.24 |
| 75 | 3.35 | 3.02 | 225 | 1.25 | 1.2 |
| 85 | 2.97 | 2.69 | 235 | 1.21 | 1.16 |
| 95 | 2.68 | 2.43 | 245 | 1.17 | 1.14 |
| 105 | 2.44 | 2.22 | 255 | 1.13 | 1.1 |
| 115 | 2.25 | 2.05 | 265 | 1.1 | 1.07 |
| 125 | 2.08 | 1.91 | 275 | 1.07 | 1.05 |
| 135 | 1.94 | 1.79 | 285 | 1.05 | 1.03 |
| 145 | 1.82 | 1.68 | 295 | 1.02 | 1.02 |
| 155 | 1.72 | 1.59 | 305 | 1 | 1 |

| Conversion Factors - To Equivalent Age (in months) | | | |
|---|---|---|---|
| Age at Last Partum | FACTOR | Age at Last Partum | FACTOR |
| 21 | 1.44 | 72 | 1.01 |
| 24 | 1.35 | 78 | 1 |
| 30 | 1.31 | 84 | 1 |
| 32 | 1.26 | 90 | 1 |
| 33 | 1.21 | 96 | 1 |
| 36 | 1.15 | 102 | 1 |
| 42 | 1.1 | 108 | 1.02 |
| 48 | 1.06 | 114 | 1.02 |
| 54 | 1 | 120 | 1.03 |
| 60 | 1.04 | | |

Cows were not given their feed rations from Dec. 9 through Dec. 12, 1992. Coincidental with this lack of feed, the month of December shows a marked decline in milk production during this period. Regardless of this fact, the Milk Production Control for this month was kept as scheduled. It was felt that, in order not to affect the results of the experiment, the recordings were to be kept as initially programmed.

Figure 2:
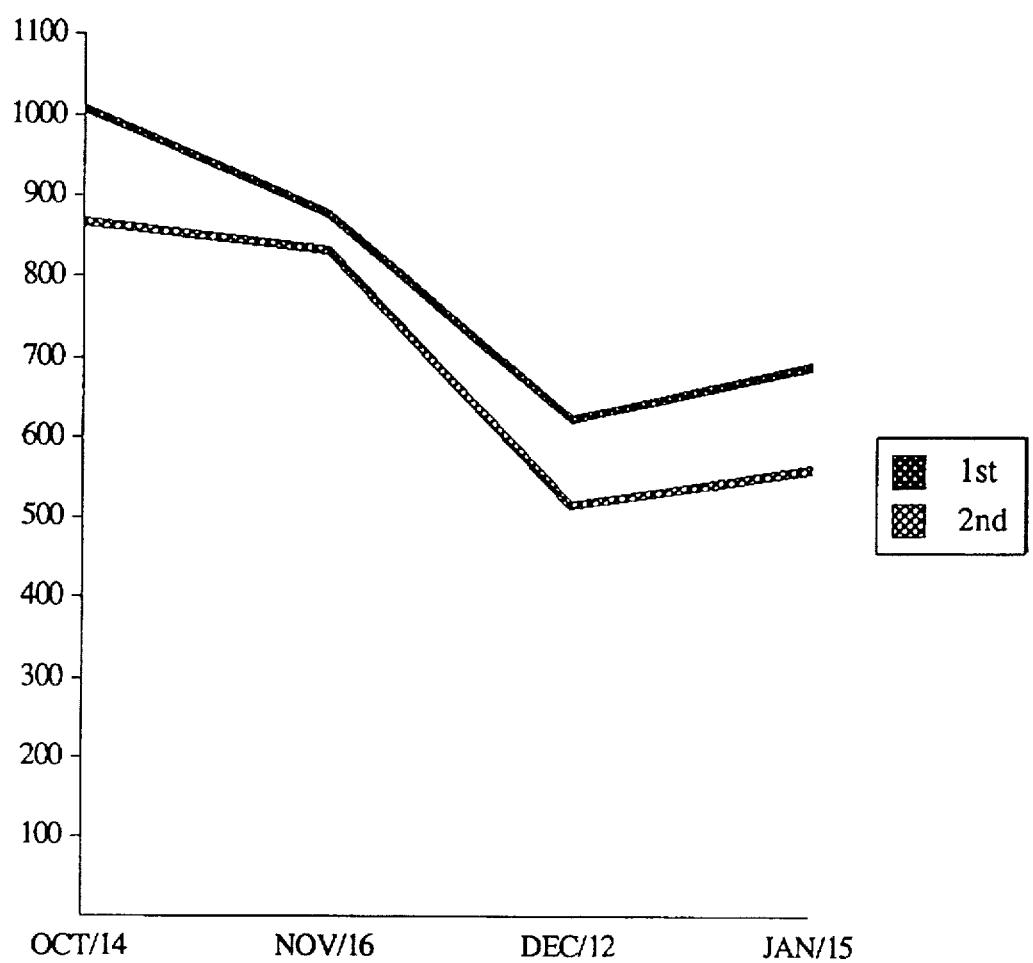
FIG. 2 illustrates milk fat content for dairy cattle fed with the metabolic corrector compared to controls.

Table "4" provides a comparison in Milk Fat Content for the "Test Group," the "Control Group" as well as the whole of the milking herd. A graph depicting these quantities is also provided as FIG. 2.

TABLE 4

Milk Fat Content - Test Group & Control Group - compared.

(Grass/Fat)

| LOT | October 14/92 Gr. | % Fat | November 16/92 Gr. | % Fat | December 12/92 Gr. | % Fat | January 15/92 Gr. | % Fat |
|---|---|---|---|---|---|---|---|---|
| Control Group | 867 | 3.11 | 831 | 3.50 | 515 | 3.17 | 559 | 3.10 |
| Test Group | 1009 | 3.39 | 875 | 3.29 | 622 | 3.38 | 688 | 3.27 |
|  | +142 |  | +44 |  | +107 |  | +129 |  |
| DIFFERENCE |  | +16.4% |  | +5.8% |  | +20.8% |  | +23.2% |
| Total Milk Pool |  |  | 595 |  | 507 |  | 500 |  |

Several conclusions can be drawn from this Example. First, the palatability of the metabolic corrector added to the ration was acceptable to the "Test Group." Second, judging from the results obtained from this Experiment the differences between the "Test Group" and the "Control Group" both in milk production as well as in fat content gradually increased with time. Thus, one can conclude that, in time, the metabolic corrector has a cumulative beneficial effect in the animal's rumen. Third, there was a definite residual effect on the "Test Group." Independent sources recorded this effect as far as Feb. 5th, 1993 before the rest of the herd was fed the metabolic corrector.

Finally, from the results of this Experiment one can definitely conclude that the metabolic corrector does have utility and economic potential in larger dairy herds.

EXAMPLE 2

An experiment was conducted with beef cattle to determine the effect of the metabolic corrector on weight increase. A test group consisting of 70 head of steers was divided out of a herd, of which 353 head remained as the control group. All animals were fed on a winter pasture of barley grass and rye grass, at a load of about 400 kg/hectare, or about 616 lbs/acre. The test group was fed with fresh forage plus 2.2 lbs of corn per day, and 20 grams of the metabolic corrector, as with the dairy cattle. The control animals had the same diet, but without the metabolic corrector.

The test animals were slightly lighter, on average, than the control group, but they were otherwise comparable. The average weights of the animals at the beginning of the experiment is shown in Table 5.

The experiment began Sep. 14 and ended Dec. 7, 1993, 84 days later. The final comparative analysis in Table 5 shows that the average daily increase and total increase in weight for the test group, in terms of percentage, was more than double the increases for the control group. The total increase averaged 142 lbs, or about 60% for the test animals, as compared to 93.8 lbs, or 28% for the control animals.

This experiment demonstrates that the metabolic corrector can increase the rate of weight gain for beef cattle, at least over the course of several months.

TABLE 5

Results of the Beef Experience

| GROUP | | TEST GROUP | | | CONTROL | |
|---|---|---|---|---|---|---|
| Date | Day | Wt(Lb) | Gain | % | Wt(Lb) | Gain | % |
| 9/14 | 0 | 236.5 | 0 | 0 | 335.2 | 0 | 0 |
| 10/08 | 24 | 275.5 | 39 | 16.5 | 360.8 | 25.8 | 7.7 |
| 11/06 | 29 | 329.8 | 54.25 | 19.7 | 390 | 29.36 | 8.13 |
| 12/07 | 31 | 378.5 | 48.7 | 14.77 | 429 | 38.68 | 9.91 |

Final Comparative Analysis

|  | Test Group | Control Group |
|---|---|---|
| Daily Increase | 1.69 Lbs. | 1.117 Lbs. |
| % Increase | 0.7% | 0.3% |
| Total Increase | 142 Lbs. | 93.8 Lbs. |
| % Increase | 60.04% | 28% |

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A metabolic corrector for animals comprising Macrocystis algae meal, dry live yeast, and a mineral component, all in essentially intact form, the metabolic corrector forming a viscous, gelatinous preparation when combined with warm water.

2. The metabolic corrector of claim 1 in which the mineral component is powdered calcite from sea shells.

3. The metabolic corrector of claim 2 in which the algae is dried and crushed to a meal, and the yeast is *Saccharomyces cereviseae* in microcapsules.

4. The metabolic corrector of claim 1 in which the algae is dried and crushed to a meal, the yeast is *Saccharomyces cereviseae* in microcapsules, and the mineral component is powdered calcite.

5. The metabolic corrector of claim 2 in which the Macrocystis algae comprises about 25% to about 75% by weight, the yeast comprises about 10% to about 50% by weight, and the powdered calcite comprises about 10% to about 30% by weight.

6. The metabolic corrector of claim 4 in which the Macrocystis algae comprises about 50% by weight, the yeast comprises about 30% by weight, and the powdered calcite comprises about 20% by weight.

7. A metabolic corrector for animals comprising about 25% to about 75% of an algae of the family Lessoniaceae, dried and crushed, about 10% to about 50% dry rive yeast, and about 10% to about 30% powdered calcite all in essentially intact form, the metabolic corrector forming a viscous gelatinous preparation when mixed with warm water.

8. A method of improving the health of an animal comprising:

(a) measuring metabolite levels in a stable tissue of the animal;

(b) identifying metabolites whose levels are lower than desired;

(c) adding the identified metabolites to crushed calcite;

(d) combining the calcite with essentially intact Macrocystis algae meal and live yeast to provide a metabolic corrector;

(e) feeding the metabolic corrector to the animal, the components of the metabolic corrector interacting to provide health benefits to the animal.

9. The method of claim 8 in which the calcite comprises about 10% to about 30%, the algae comprises about 25% to about 75%, and the yeast comprises about 10% to about 50% by weight.

10. The method of claim 8 in which the metabolic corrector is provided in an amount of about 0.1 g to 1.0 g per kg body weight.

11. A method of improving the health of an animal comprising combining crushed calcite with essentially intact Macrocystis algae meal and live yeast to provide a metabolic corrector, and feeding the metabolic corrector to the animal in an amount sufficient to provide health benefits to the animal.

12. The metabolic corrector of claim 7 in which the yeast is in microcapsules.

13. The metabolic corrector of claim 12 in which the yeast is *Saccharomyces cereviseae*.

14. The method of claim 11, in which the animal is a dairy cow and feeding the metabolic corrector to the cow for several months improves milk production and fat content.

15. The method of claim 11, in which the animal is a ruminant and the metabolic corrector adjusts the pH of the ruminal medium to a desirable level and improves digestive metabolism.

16. The method of claim 11, in which the metabolic corrector is fed to beef cattle for several months, and increases the rate of weight gain.

17. The method of claim 11, in which the animal is a horse and the metabolic corrector stabilizes the digestive process, normalizes fecal matter, and increases appetite.

18. The method of claim 11, in which the animal is a hen and feeding the metabolic corrector increases the quantity and size of eggs laid, and reduces viral mortality.

\* \* \* \* \*